United States Patent [19]

Smiley

[11] 4,352,623

[45] Oct. 5, 1982

[54] GRAIN DISTRIBUTOR AND METHOD

[76] Inventor: George W. Smiley, Rte. 4, Greensburg, Ind. 47240

[21] Appl. No.: 64,875

[22] Filed: Aug. 8, 1979

[51] Int. Cl.³ ............................................. B65G 65/32
[52] U.S. Cl. ................................... 414/294; 198/637; 414/302; 414/786
[58] Field of Search ................ 414/133, 294, 300–302, 414/786; 198/637; 222/491

[56] References Cited

U.S. PATENT DOCUMENTS

| 855,744 | 6/1907 | Argall | 198/637 X |
| 952,562 | 3/1910 | Durst | 222/491 X |
| 2,099,071 | 11/1937 | Lundbye | 198/637 X |
| 2,895,625 | 7/1959 | Clark | 414/302 |

Primary Examiner—Robert G. Sheridan
Attorney, Agent, or Firm—Wood, Herron & Evans

[57] ABSTRACT

An improved grain or particulate distributor includes a radially extending conveyor mounted for sweeping about the center of a bin for evenly and homogeneously distributing material therein. Discharge or sweeper bars are adjustably angularly mounted across selected areas of the conveyor for discharging grain from one trailing side of the conveyor into the bin, while an inclined surface with adjustable vanes facilitates the smooth transition of the discharged grain from the belt to the silo. Grain agitation is minimized to impede separation of fine from coarse particles. Means are provided for also distributing a portion of grain to the periphery of the silo. A chute for feeding the conveyor has a grain controlling gate responsive to the amount of grain in the chute available for feeding, and the conveyor belt has two speeds which are selected responsive to the volume of grain in the chute.

27 Claims, 9 Drawing Figures

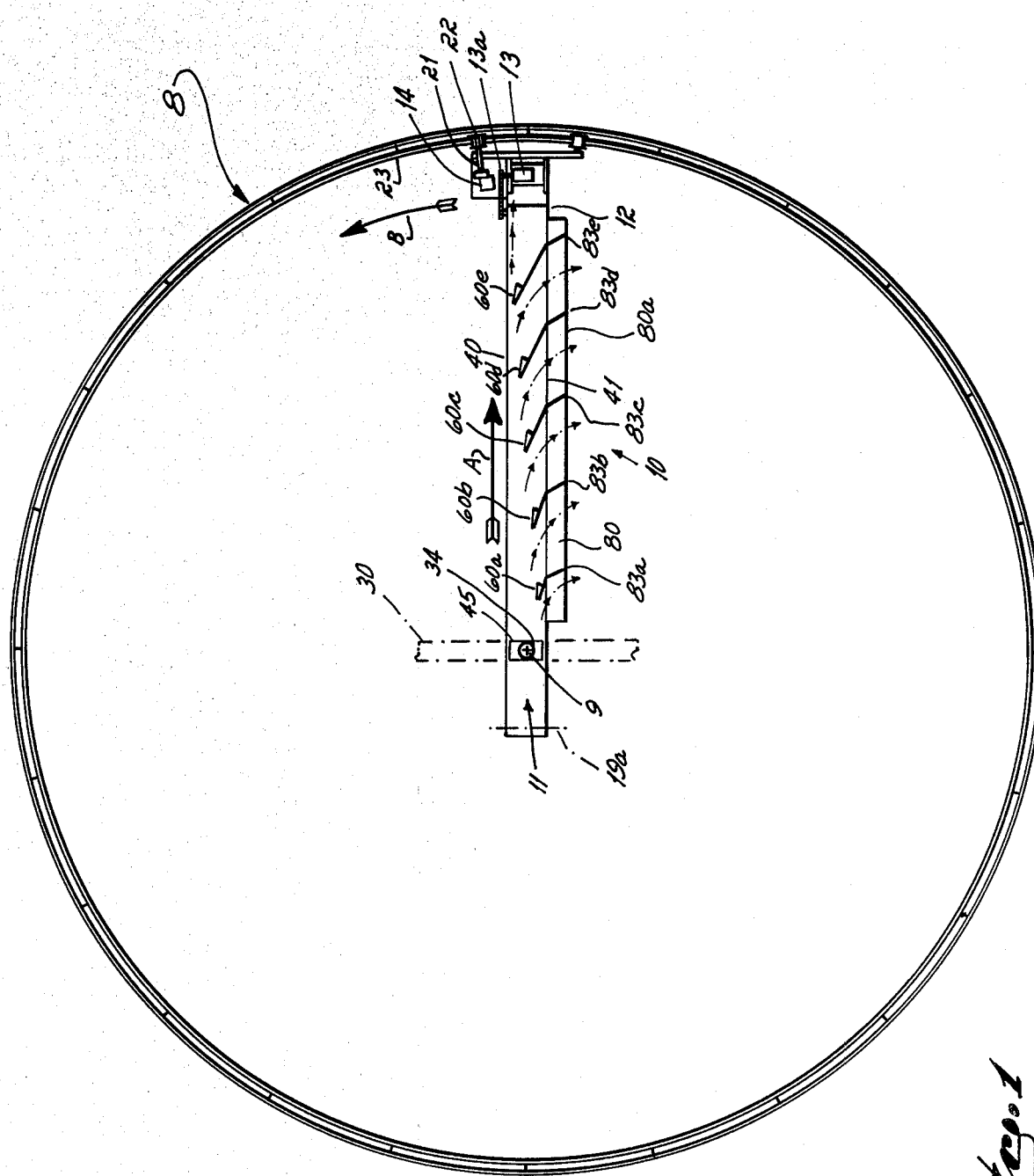

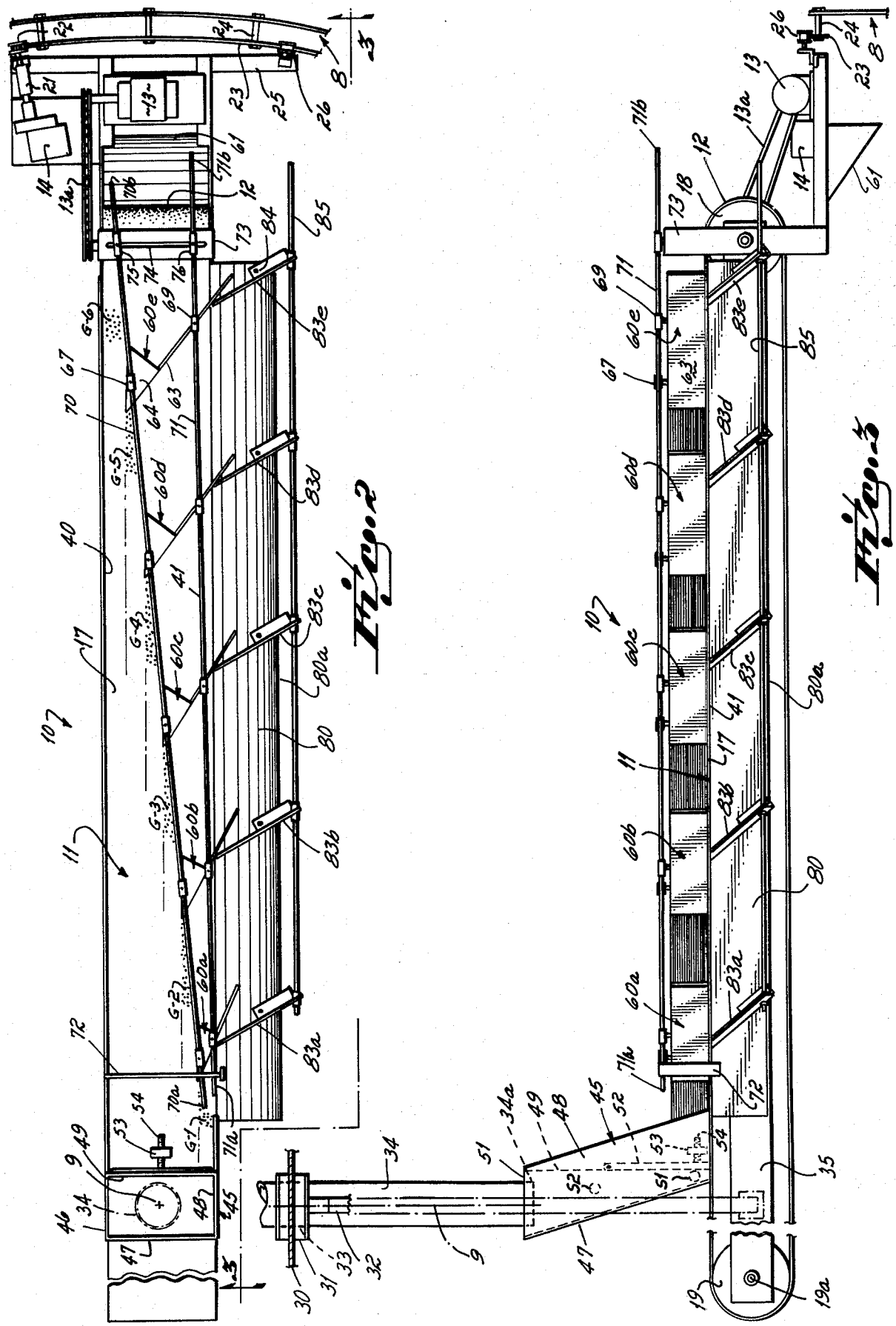

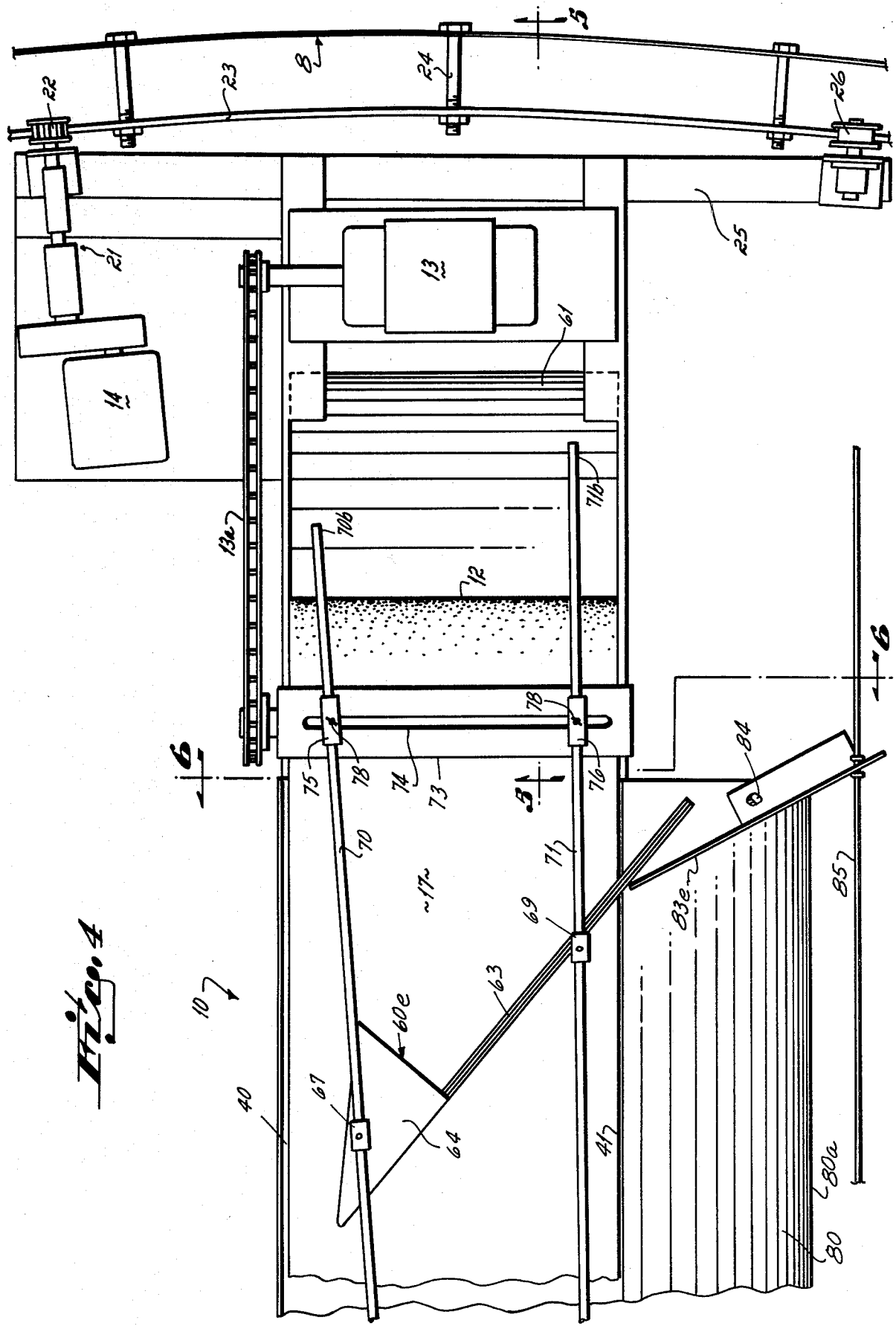

GRAIN DISTRIBUTOR AND METHOD

This invention relates to distributors of granular materials and particularly to apparatus for evenly distributing grain in a grain bin.

It has been common practice for years to distribute grain into bins by impinging it on a rotating plate and spreading it about the plate into the bin. See, for example, my previous U.S. Pat. No. 3,262,586. It has also been known to distribute material into a bin feeding it onto a radially disposed moving conveyor belt and sweeping the belt horizontally around, the material being conveyed outwardly from the center area of the bin and falling into the bin from the radius prescribed by the belt. A prior device of this type is described, for example, in U.S. Pat. No. 2,721,665.

In the distribution of grain into a bin, one desirable parameter is that the grain remain homogeneous. That is to say that many grains, as they are stored, comprise coarse and fine particles together and it is highly desirable to keep these thoroughly mixed. Such a requirement is based in part on the need for uniform drying of the grain. In many bins, fans are used to blow up through the grain to dry it. The blown air tends to take the path of least resistance through the grain. Where fines have separated from coarse particles, the fines "pack" and the drying air blows around the "pack", failing to dry the fines properly. This leads to nonuniformity in overall grain drying and the attendant problems therewith.

Specifically, it is usually desirable to dry the grain to about 14½% moisture content for storage. When drying is nonuniform, additional heat may be required to dry the fill to this status. Such additional heat could overdry about 35% to 40% of the grain down to about 10% moisture content, lower than desirable. Alternately, the drying operation is run for a longer time having much the same effect.

It will be appreciated, then, that if drying is uniform, the time duration of the drying operation can be significantly reduced as compared to the extra time required for air drying of nonhomogenous mixtures of coarses and fines. No extra heat is required and the grain is not over-dried. Thus, a substantial energy savings is realized, together with a more uniform, desirable moisture content. Accordingly, it is very important to provide a homogeneous mix of coarse and fine grain particles in the distributed fill.

In the prior art devices of the type mentioned, the grain is thrown about very actively. In my prior patent, for example, it hits a spinning plate and is thrown outwardly. As the particles land and move with respect to each other, they tend to seperate into accumulation groups or areas according to their size, just as small and large rocks, for example, tend to separate into lower and upper levels, respectively, when shaken together in a pan or bucket. Moreover, if the grain is unevenly distributed from a belt, for example, it does not build up a level "fill" and the distributed grain forms valleys and peaks at the top of the fill. The distributing grain falls down the sides of these, causing further agitation and separation. As stated, it is desirable to eliminate such separation and thus to make the fill mix of grain as level and as homogeneous as possible.

Accordingly, it has been one objective of this invention to provide improved apparatus and methods for distributing particulate or granular material into a silo or bin.

A further objective of the invention has been to provide improved apparatus and methods for evenly distributing particulate or granular material into a bin or silo.

A further objective of the invention has been to provide an improved chute and conveyor feeding apparatus and methods for evenly distributing granular material into a silo or bin.

A further objective of the invention has been to provide improved apparatus and methods for discharging granular material adjustably and evenly from one edge of a conveyor belt.

A still further objective has been to provide improved methods and apparatus for evenly distributing a homogeneous mixture of grain into a grain bin.

To these ends, a preferred embodiment of this invention comprises a grain distributor including a radially disposed conveyor belt running in a radial direction outwardly from the center of a bin or silo to be filled, and being mounted for rotating or sweeping around the bin horizontally in a circle, and discharge apparatus for evenly discharging grain from and along an edge of the conveyor belt onto the fill grain with minimal grain agitation during distribution. The discharge apparatus is adjustable to fine tune the evenness of the discharge and is disposed to permit a discharge off the end of the belt for filling up the peripheral areas of the silo.

More particularly, the discharge apparatus provides for the selective discharge of granular material as it is conveyed along the belt such that the material uniformly falls off the trailing side edge of the conveyor belt as the belt moves forwardly and at the same time sweeps around the silo. Specifically, the discharge apparatus includes adjustable stationary sweeper bars which sequentially extend further across the conveyor belt as the belt moves radially outward. Thus a first small section of grain is diverted to the side of the belt near the center of the bin, a next small section of grain is diverted to the same side but downstream area of the belt, and so on all along the discharge side of the belt until only a small portion of grain along the opposite side of the belt, i.e., its leading side, remains for discharge off the radially outward end of the belt to the periphery of the bin.

The sweeper bars are adjustably mounted for angular orientation and for extension across the belt for fine tuning an even discharge. Also, the trailing edge or side of the apparatus is provided with an inclined transition surface for further distributing and controlling the discharging grain as it leaves the belt and prior to falling from the apparatus into the bin. Adjustable vanes on the incline are operably disposed to cooperate with the sweeper bar orientation for further grain control.

To further control the evenness of distribution, grain is fed onto the belt from a hopper or chute having an adjustable gate or door responsive to the volume of grain to be fed. Moreover, the chute is provided with sensing means for controlling the conveyor drive in response to the volume of grain to be fed. A first sensor for one volume of grain is operable to start both the conveyor belt drive at one speed and the apparatus drive for sweeping the conveyor around the silo, while a second sensor is operable to increase the conveyor belt speed responsive to the existence of a greater volume of grain in the chute to be fed.

The combination of the sweeping conveyor and the discharge apparatus described herein substantially reduces grain activity or particle movement during distribution and provides a more even fill and a more homogeneous grain mix than has been provided before. The invention fills the bin with a grain "fill" having a substantially level surface thus eliminating long inclined fill surfaces which promote grain movement and separation during filling. Thus the apparatus and methods described produce an improved grain fill and a more uniform drying potential than the prior known apparatus. The combination of elements cooperates in a unique way to reduce grain motion or activity and thus reduce separation between coarses and fines as the grain is distributed.

These and other objects and advantages will become even more readily apparent from the following detailed description of a preferred embodiment of the invention and from the drawings in which:

FIG. 1 is a top plan view of the invention;

FIG. 2 is a top view of the invention in more detail than FIG. 1;

FIG. 3 is a side view taken along lines 3—3 of FIG. 2;

FIG. 4 is a top view of the outer end of the invention shown in FIGS. 1-3;

Figure 5:
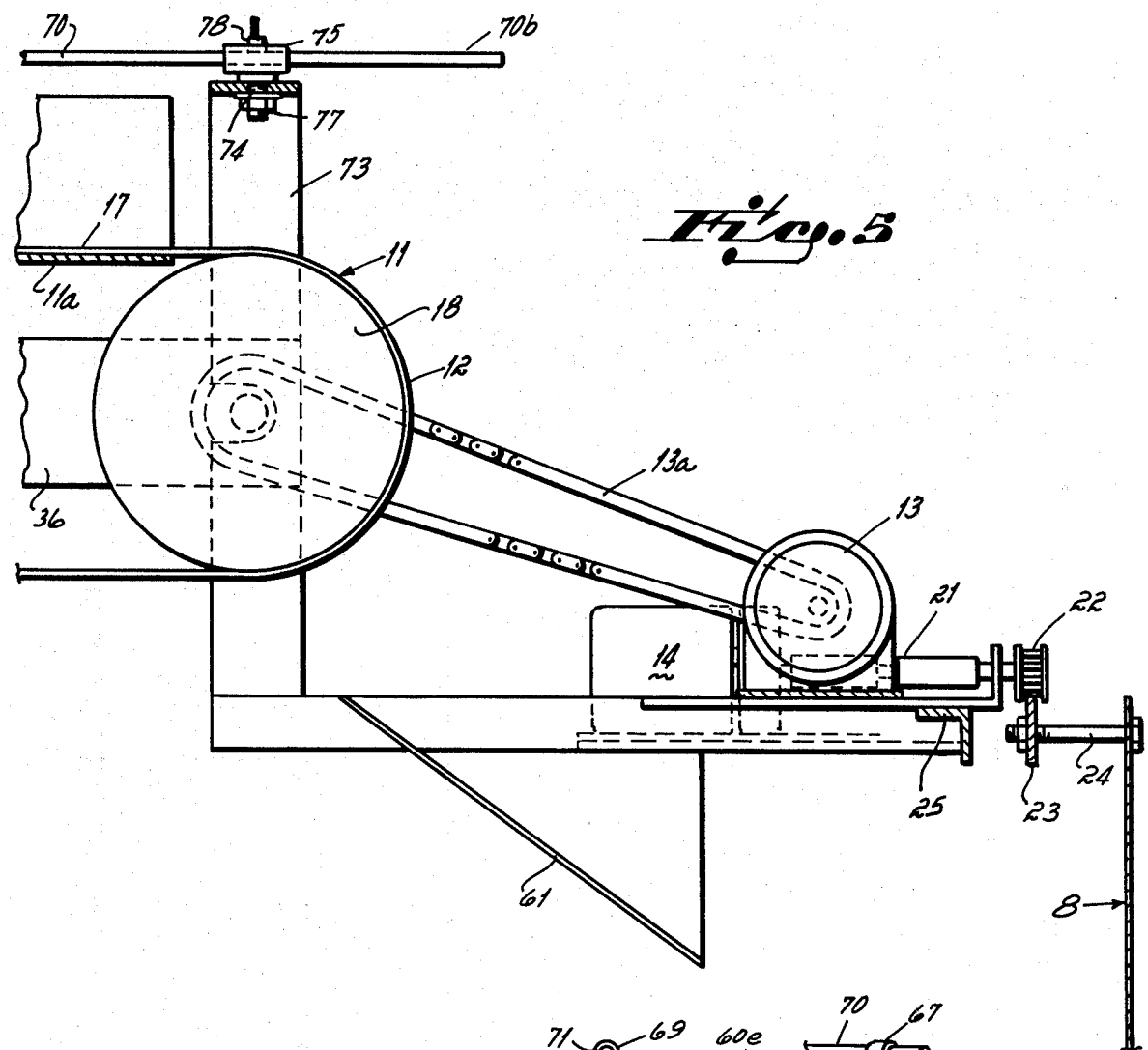
FIG. 5 is a cross-sectional view taken along lines 5—5 of FIG. 4.
Figure 6:
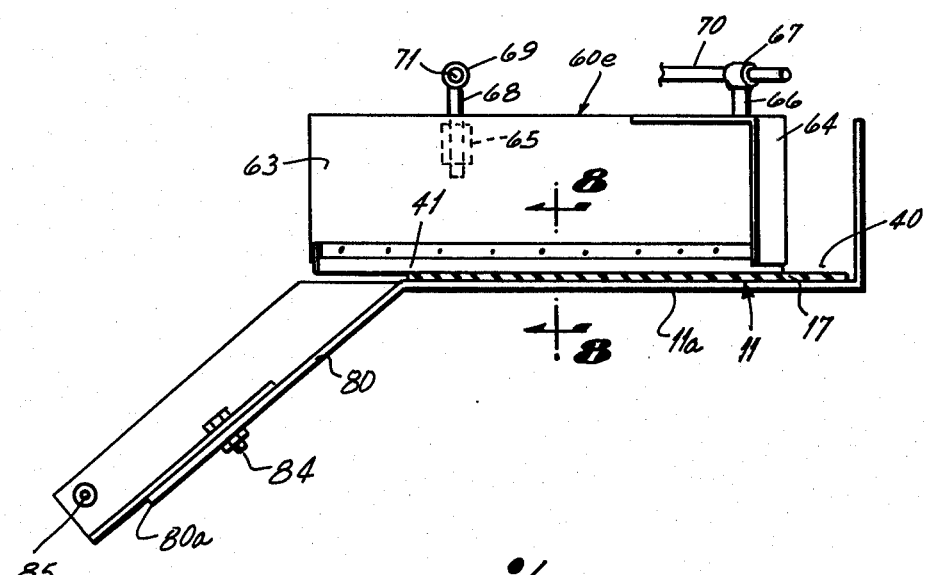
FIG. 6 is a cross-sectional view taken along lines 6—6 of FIG. 4.

Turning now to the drawings, FIG. 1 depicts a plan view of a preferred embodiment of the invention. In FIG. 1, a circular grain bin 8 is depicted in association with a preferred embodiment of the distributing apparatus 10, according to the invention. Of course, it will be appreciated that the distributing apparatus 10 is useful for the distribution of any particulate or granular materials, for example, into a bin or a silo. The invention, however, shall be particularly described in connection with the even distribution of grain into a grain bin 8. Such a bin may be, for example, 100 feet high and 32 feet in diameter. The bin includes a central axis 9 and an outer circular periphery defined by the bin wall at 8.

The distributing apparatus 10 includes a conveyor means 11. The conveyor means is disposed to convey grain in a radial direction indicated by the arrow A. Also, the conveyor is mounted for sweeping around the bin 8 in the sweep direction indicated by arrow B. In this disposition, then, the conveyor is mounted for rotation about the central area or axis 9 of the bin 8 and has an outer end 12 disposed near the peripheral area of the bin. The conveyor further includes a first drive means 13 for driving the conveyor in a radial direction and a second drive means 14 for sweeping the conveyor around the bin.

Further describing the conveyor and the first and second drive means, it will be appreciated that the conveyor constitutes a belt conveyor including a belt 17, an end drive pulley 18 and another end idler pulley 19 mounted about axis 19a on an opposite side of the central axis 9 of the bin. These features are best seen in FIGS. 3-5 of the drawings. It will be appreciated that the first drive means 13 constitutes any suitable form of driving motor such as a gear drive motor, for example, connected by a drive chain 13a to drive pulley 18 for driving the conveyor belt 17. It will also be appreciated that suitable belt take-up means (not shown) could be provided in association with the idler pulley on the opposite end of the conveyor near the pulley 19.

The second drive means also constitutes an appropriate motor such as a gear motor 14 connected by a drive train 21 to a drive gear 22. Drive gear 22 is disposed to frictionally engage circular ring 23 which extends all about the bin wall 8 and is mounted thereto by means of bolts and spacer assemblies 24. A mounting bracket 25 supports and mounts an idler roller 26 (FIG. 1) for further supporting the outward end of the conveyor 11 on the ring 23. The first and second drive means, the drive gear and the pulley 18 can all be mounted at the outer end of the conveyor 11 by any suitable structural means.

Figure 7:
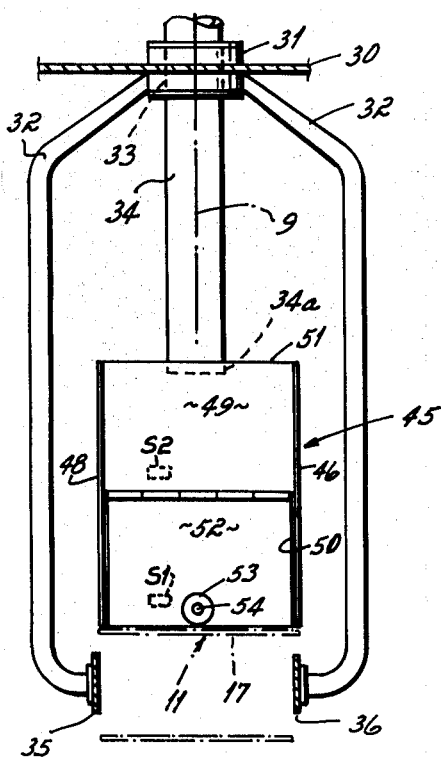
FIG. 7 is a partial front view of the feed chute and mounting apparatus of the invention.

Turning now to a description of the rotational mounting of the conveyor for sweeping in direction B, attention is directed to FIGS. 2, 3 and 7 of the drawings. In this connection, a mounting plate or bracket 30 is hung from the roof area or upper structure of the bin 8. This bracket 30 is shown only in phantom in FIG. 1 and is depicted in diagrammatic cross-section in FIG. 3. The central end or area of the conveyor 11 is rotationally supported by the bracket 30. As best seen in FIG. 7 a collar 31 is mounted on the bracket or plate 30 and has a rotatable outer member to which a U-shaped hanger 32 is attached. The collar 31 has a central bore 33 through which a grain fill pipe 34 extends as will be described. Below the collar 31 the U-shaped bracket 32 turns inwardly and engages respective sides 35 and 36 of the conveyor 11. Thus the central portion of the conveyor is rotationally mounted such that the conveyor is disposed for sweeping around the bin 8 in a horizontal circular plane in the direction of arrow B. Of course, it will be appreciated then that the conveyor 11 is mounted at an upper portion of the circular bin 8 approximately at the area where the cylindrical portion of the bin 8 terminates and the roof begins.

While the preferred embodiment of the distribution apparatus has been and will be described as conveying grain from a central area of the bin outwardly to a peripheral area thereof for dropping into the bin, it will also be appreciated that grain could be conveyed in a radial direction, for example, from an outer end of the conveyor inwardly to the center area thereof. In this connection, some form of rotating feed pipe or fill could be associated with an outer end of the conveyor and the conveyor would be constructed and operated in simply a reverse manner as described herein without departing from the scope of this invention.

Turning now to the description of the preferred embodiment of the distribution apparatus, including the conveyor means 11, it will be appreciated that as the conveyor means 11 is operated in a radial direction outwardly from a central area of the bin, and is swept around the bin in the direction of arrow B, the conveyor includes a leading edge 40 and a trailing edge 41 (FIG. 1). In the preferred embodiment, the discharge means of the distribution apparatus is operable to divert and to discharge grain from the trailing edge 41 of the conveyor into the bin. Of course, it would also be possible in an alternate embodiment to discharge grain from a leading edge 40.

The distribution apparatus is provided with chute means for introducing grain onto the conveyor. A preferred embodiment of the chute means is perhaps best depicted in FIGS. 2, 3 and 7 wherein a chute 45 is depicted. Chute 45 has four walls 46, 47, 48 and 49. An outlet 50 is provided at the lower end of the wall 49. The upper end 51 is disposed in operative relationship with the discharge end 34a of the fill pipe 34.

The chute is further provided with a closure 52 operatively closing the outlet 50. Closure 52 is provided with an adjustable weight 53 extending on a screw 54 from the lower end of the closure 52. When the weight is moved outwardly, i.e., toward the periphery of the bin on the screw 54, the closure tends to remain closed with a greater force than when the weight 53 is moved inwardly with respect to the screw. When grain is introduced into the chute 45 from the fill pipe 34 it falls downwardly into the area of the outlet 50. When the grain reaches a sufficient volume within the chute 45, its weight operates to open the closure 52 and permits the grain to leave the chute on the conveyor belt 17. The weight is thus adjusted to provide an exact door opening for the amount of grain pressing on the door.

Finally, the chute 45 is provided with two controls which are S-1 and S-2 in the approximate positions as shown for sensing the presence of grain at the levels in the chute corresponding to the levels of the switches. These switches are operatively connected through control means C-1 and C-2 via lines L-1, L-2 and L-3, for example to the first and second drive means in a manner as will be described. The conveyor belt 17 runs around pulleys 18 and 19 as shown in FIG. 3. Thus it extends from a position beyond the center area or center axis 9 of the bin to the discharge end 12 of the conveyor.

Turning now to a consideration of the diverting and discharging apparatus of the invention, it will be appreciated that the invention is particularly adapted for the distribution of a level fill of grain in the silo. That is, as the conveyor 11 sweeps around the silo, it is desirable that the grain discharge therefrom falls into the silo and forms a fill of grain which has a level top surface in order to reduce the grain from hitting the top surface and falling down any undulations or inclines therein.

Accordingly, it has been one objective of the invention to provide a grain distribution apparatus which distributes grain into a bin in a very even and homogeneous fashion. In this connection, the present invention contemplates the removal of a plurality of segments of grain from the conveyor 11 and the dropping of the segments into the bin to form a level fill. In this connection then, and with respect to FIG. 1, it will be appreciated that the distribution apparatus includes a plurality of diverter or sweeper bars 60 (referred to respectively as bars 60a, 60b, 60c, 60d and 60e). As shown in FIG. 1, and particularly FIG. 2, the sweeper bars extend across the conveyor belt 17 at an angle with respect to the radial direction of movement of the belt 17 so as to be in a position to divert grain on the belt toward the trailing edge 41 of the conveyor. Moreover, it will be appreciated that the bars extend various distances across the conveyor. Thus the upstream-most sweeper bar 60a extends only a small distance across the conveyor 17 while the following bar 60b extends slightly further across the conveyor and so on through bars 60c, 60d and 60e.

It will also be appreciated that a chute 45 is operable to deposit a layer of grain onto the conveyor belt 17 and across the width of the conveyor belt 17. Accordingly, the sweeper or diverter bars 60a-60e are operatively associated with the conveyor belt 17 for sequentially removing portions of grain on the conveyor belt 17 and diverting those portions over the trailing edge 41 of the conveyor. Thus, for example, a first portion of grain G-1 as viewed in FIG. 2 is diverted from the conveyor 17 by the first sweeper bar 60a. A second portion G-2 of grain is diverted from the conveyor belt 17 by the sweeper 60b and so on through portion G-5 of grain which is diverted by the sweeper bar 60e. It will be noticed that there is a remaining portion G-6 of grain which has been conveyed along the leading edge 40 of the conveyor belt 17. This portion G-6 of grain is not diverted by any sweeper bar in the preferred embodiment, but rather is carried to the end 12 of the conveyor.

As shown in FIGS. 2 and 3, end 12 of the conveyor is operatively disposed over a radially extending inclined slide 61 of the conveyor apparatus. Thus the grain portion G-6 falls from the discharge end 12 of the conveyor belt 17 onto the inclined slide where the grain is directed into the outer or peripheral area of the bin 8 and beneath the first and second drive means 13 and 14. This ensures a complete level fill of grain from the peripheral wall of the bin 8 back to the center area.

Figure 8:
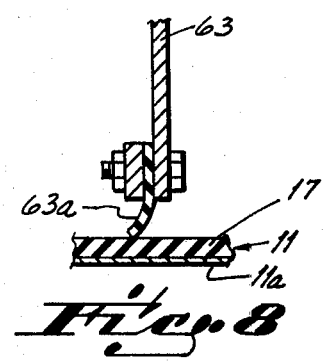
FIG. 8 is a cross-sectional view taken along lines 8—8 of FIG. 6.
Figure 9:
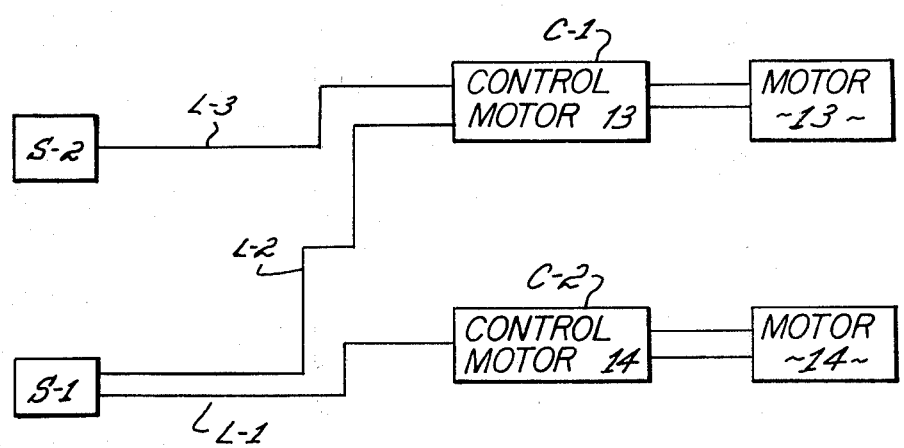
FIG. 9 is a schematic view of the control means and switches as described herein.

Turning now to the particular construction of the sweeper bars, their construction and their mounting are best seen in FIGS. 2, 3, 4 and 6. Each sweeper or diverter bar includes a plate 63 and a lower sweeping member 63a made from an appropriate rubber or flexible material. As shown in FIG. 8, the edge 63a is disposed in a sweeping engaging relationship with belt 17 which is supported on a flat plate member 11a of the conveyor means 11. Thus as the belt in the radial direction indicated by the arrow A, the sweeper bar assembly 63 is operable to sweep grain from the belt 17. Because of the angulation of the bars as shown in the Figures, they divert the grain toward the trailing edge 41.

Each of the sweeper bars is provided with mounting brackets 64 on an outer end thereof, and mounting brackets 65 (FIG. 6) on an intermediate portion thereof. The mounting brackets 64 are drilled to receive the mounting bolts 66 depending from the control rod sleeves 67. The mounting brackets 65 are also adapted to receive the depending bolts 68 from the control rod sleeves 69. A first control rod 70 and a second control rod 71 extend generally along the conveyor for mounting the sweeper bars 60. The inner ends 70a and 71a of the control rods are mounted to a bracket 72 which is mounted across the conveyor apparatus 11 toward the central area thereof (FIG. 2). The outer ends 70b and 71b of the first and second control rods are respectively mounted to a mounting bracket 73 at the outer end of the conveyor apparatus 11. Mounting bracket 73 is provided with an elongated slot 74 in which are pivotally mounted two sleeves 75 and 76. Sleeve 75, which is identical to sleeve 76, and its mounting are shown in FIG. 5. where the sleeve is mounted to the elongated slot 74 by means of a mounting bolt 77. Further, the sleeve is provided with a set screw 78 for engaging the control rod 70 to hold the control rod against longitudinal movement. The sleeve 76 and its mounting are identical.

Accordingly, it will be appreciated that the control rods provide an adjustable pivotal mounting for the sweeper bars 60. The control rods, when the set screws 78 are loose, are pushed or pulled to adjust the angulation of the sweeper bars 60 and to adjust their extension across the conveyor belt 17. Moreover, the sleeves 75 and 76 can be moved together or apart to thus move the rods in the same relationship and further adjust the orientation of the sweeper bars 60. Thus the sweeper bars 60 can be adjusted to remove selected portions of grain from the belt 17 and the various adjustments provided by the construction as has been described, provide for a very fine tuning of the diverting and discharging operation of the sweeper bars 60.

In this regard it will be appreciated that for each revolution of the conveyor 11 about the bin in the direction of arrow B, the outer portions of the conveyor traverse a greater bin area than the inner or central portions of the conveyor nearer the axis 9. Accordingly, more grain per revolution must be dispensed from the outer end of the trailing edge 41 near the periphery of the bin 8 than from the inner end near axis 9 if the resulting overall fill is to be level. It is to this end that the sweeper bars are adjusted by means of the foregoing structure.

Further describing the distribution apparatus, it will be appreciated that transition plate 80 is disposed along the trailing edge 41 of the conveyor apparatus. Transition plate 80 is seen in end elevation in FIG. 6. It serves to smooth the transitional movement of the grain from the belt 17 to the point where the grain drops from the trailing edge 80a of the transition plate. Thus as the grain is diverted from the belt 17, it slides onto the transition plate and downwardly on the transition plate to the edge 80a where it falls evenly into the bin.

The transition plate 80 is provided with a plurality of vanes 83 which are pivoted to the transition plate by means of bolts 84. Additionally, the ends of the vanes 83, which are identified as 83a through 83e, are secured by means of a control rod 85. Thus when the bolts 84 are loosened, all of the vanes can be adjusted in unison by means of the control rod 85 which is secured to the ends of the vanes by any suitable means.

The vanes 83 respectively cooperate with the sweeper bars 60 in the smooth diversion of grain from the belt 17 into the bin. Specifically, the vanes 83 ensure that no grain will be carried beyond the particular discharge area associated with the particular sweeper bar. This further ensures a more even and level fill.

As the grain is conveyed along the belt then, it is swept off the belt by the sweeper bars. It will be appreciated that not all the grain segment will travel to the point of overlap between the bar and the conveyer edge 41 but rather some grain will fall off the edge before it actually reaches the sweeper bar as the whole segment of grain approaches and is upset by the bar. The transition plate 80 serves to facilitate the spreading out of the grain as it falls off the conveyor to promote an even more level final fill.

Turning now to the description of the operation of the conveyor, it will be appreciated that the switches S-1 and S-2 located within the chute 45 are operable to sense the presence of grain at the respective levels in the chute where the switches are located. Accordingly, when the switch S-1 is closed in response to grain at the level of switch S-1, a circuit of any suitable construction and including lines L-1, L-2 and the control means C-1 and C-2 is energized to energize the first and second drive means. Accordingly, the first drive means 13 is operative to begin motion of the belt 17 and second drive means 14 operates to begin to sweep the conveyor around the bin. As the grain moves through the chute and past the outlet thereof, the weighted closure 52 opens to permit a layer of grain to be deposited on the belt 17. Thereafter the belt conveys the grain along the conveyor apparatus 11 where it is diverted by the sweeper bars 60 off the conveyor and into the bin, the grain moving across the transition plate 80 and then into the bin along a multiplicity of paths which ensures a level fill of grain. Moreover, one portion of grain is conveyed to the discharge end 12 of the belt 17 where it moves down the slide 61 into the peripheral area of the bin ensuring a level fill at that around the periphery.

Also, it will be noted that only a very slight amount of grain is necessary, for example, to fill the central area and that respectively greater amounts of grain are necessary to fill the bin in a level condition as the grain moves outwardly on the belt. This is occasioned by the fact that the sweeping speed of the belt over the bin is in effect increased as the belt moves from the central area outwardly to the periphery. Thus, as previously mentioned, the area transcribed by the particular trailing edge proximate the sweeper bar 60e, for example, requires a greater amount of grain than does the area transcribed by the trailing edge of the conveyor and of the transition plate associated with the sweeper bar 60b, for example. Accordingly, the sweeper bars are angularly adjusted and extended across the conveyor belt to fine tune the discharge all along the trailing edge 41 so that the result is a level fill into the bin. Accordingly, it will be appreciated that the invention contemplates the proportional dividing up of a conveyed layer of grain and the selective diversion and discharge of the proportional volumes of grain into a bin in order to form a level fill.

Once the fill pipe has been operated to fill the chute 45 with a greater volume of grain such as will operate the switch S-2, then a greater volume of grain is present in the chute and the closure 52 opens in response thereto which effectively deposits a greater amount of grain on the belt. Under these conditions it may be desirable to spread the grain or distribute the grain in a thinner fashion, and to this end the switch S-2 is connected through appropriate circuitry including line L-3 and control means C-1, for example, to the first drive means 13 in order to increase the speed of the first drive means to run the belt 17 faster. In this regard, the first drive means 13 can comprise a two-speed or a multiple-speed motor for operating in response to switch S-2, or to a plurality of switches in order to increase the speed of the belt 17 in response to the volume of grain available for introduction onto the belt 17.

Of course it will be appreciated that as the sweeper bars 60 are adjusted to fine tune the grain discharge to provide a level fill, the vanes 83 can be adjusted in order to effectively cooperate with the sweeper bars and to provide the level grain fill.

The diversion of proportional amounts of grain from the belt 17 into a multiplicity of dropping zones or distribution zones results in a more level fill of grain in the bin, and prevents a fill wherein the entire surface is inclined in a cone-shaped pattern, for example. Accordingly, the distribution apparatus 10 does not tend to form significant valleys or peaks on the upper surfaces of the grain fill within the bin and there is very little grain movement once the grain has been discharged onto the fill. This eliminates grain agitation and separation between coarse and fine particles and eliminates packing which, as specified herein, may cause nonuniform drying.

Accordingly, the invention is operable to provide a level and more homogeneous grain fill, thereby promoting more uniform drying and reducing the amount of energy required for either overtime drying or extra heat drying. In this connection, it will be also appreciated that the grain particles are handled as smoothly as possible with a minimum of grain spinning, rolling and agitation.

Having now described a preferred embodiment of my invention, various other modifications and alterations will become readily apparent to those of ordinary skill, without departing from the scope of my invention, and I intend to be bound only by the claims appended hereto.

I claim:

1. Apparatus for evenly distributing grain into a bin and comprising:
   a conveyor means mounted in a bin and extending from a central area toward a peripheral area thereof,
   chute means for introducing grain onto one portion of said conveyor means proximate said central area, said conveyor means having a moving conveying surface for conveying said grain outwardly toward said peripheral area in a radial direction,
   means mounting said conveyor means for sweeping around said bin in a horizontal plane,
   discharge means for removing sequential portions of grain from said conveying surface and dropping the portions evenly into said bin as said conveyor means sweeps around said bin to evenly fill said bin,
   said discharge means comprising a plurality of sweeper bars sequentially extending at selected angles across portions of said conveying surface for diverting portions of grain thereon toward one edge of said conveying surface,
   said angles of extension of said sweeper bars being adjustable, and
   further including mounting means for adjusting said angles, said mounting means for adjusting said angles comprising a common first control rod extending along said conveyor, one end of said sweeper bars being pivoted to said control rod and another portion of said sweeper bars being pivotally mounted, whereby longitudinal movement of said control rod adjusts said angles of extension of said sweeper bars.

2. Apparatus as in claim 1 including a common second control rod, said other portions of said sweeper bars being pivotally mounted thereto and said second control rod being selectively longitudinally movable for adjustment of said sweeper bars.

3. Apparatus as in claim 2 wherein outward ends of said control bars are also selectively movable directly toward and away from each other to adjust said angle of extension.

4. Apparatus as in claim 2 including a control rod mounting bracket disposed across said conveyor,
   an elongated slot in said bracket, and two respective control rod sleeves pivotally mounted in said slot for adjustably mounting outward ends of said respective control rods for longitudinal adjustment and for movement toward and away from each other.

5. Apparatus as in claim 1 further including an inclined transition plate extending along one edge of said conveyor means, said plate inclined downwardly from said conveyor means into said bin and said sweeper bars angled to divert grain onto said transition plate.

6. Apparatus as in claim 5 including deflection vanes on said transition plate, said deflector vanes disposed in operative relationship with respective sweeper bars for directing grain long said transition plate.

7. Apparatus as in claim 6 wherein said deflector vanes are pivotally mounted to said transition plate and are adjustable for cooperation with said sweeper bars in different adjustment positions.

8. Apparatus as in claim 5 wherein said conveyor means includes trailing and leading edges on opposite sides of said conveying surface, said transition plate disposed along said trailing edge.

9. Apparatus as in claim 1 including an inclined slide means radially extending from an outward end of said conveyor for distributing a portion of grain from said conveyor means outwardly toward a periphery of said bin.

10. Apparatus as in claim 9 including first and second drive means disposed at an outer end of said conveyor means for respectively driving said conveying surface outwardly and for sweeping said conveyor means around said bin, said slide means directing grain from said conveying surface beneath said first and second drive means.

11. Apparatus as in claim 1 including baffles on opposite sides of said conveyor means extending between said central area and a first grain portion removal area associated with a first one of said sweeper bars for preventing grain from falling into said bin prior to reaching said first removal area.

12. Apparatus as in claim 1 including a grain chute means disposed centrally in said bin for introducing grain onto said conveyor means, said chute means having a grain outlet and a closure operatively disposed in said outlet and variably opening in response to the volume of grain proximate said outlet for introduction onto said conveyor means.

13. Apparatus as in claim 12 including an adjustable weight means on said closure for adjusting the extent of opening of said closure responsive to the volume of grain adjacent thereto.

14. Apparatus for evenly distributing grain into a bin and comprising:
   a conveyor means mounted in a bin and extending from a central area toward a peripheral area thereof,
   chute means for introducing grain onto one portion of said conveyor means proximate said central area, said conveyor means having a moving conveying surface for conveying said grain outwardly toward said peripheral area in a radial direction,
   means mounting said conveyor means for sweeping around said bin in a horizontal plane,
   discharge means for removing sequential portions of grain from said conveying surface and dropping the portions evenly into said bin as said conveyor means sweeps around said bin to evenly fill said bin, and
   a multi-speed drive means for said conveyor means, a chute means for introducing grain onto said conveyor means, and further including grain sensing switching means operatively disposed with said chute means for controlling said drive means to operate at a first speed in response to the presence of a preselected volume of grain in said chute, and at a greater speed in response to a greater volume of grain in said chute.

15. Apparatus as in claim 14 including second drive means for sweeping said conveyor around said bin, said second drive means operably controlled to operate responsive to the condition of one of said switching means operating said multi-speed drive means at said first speed.

16. Apparatus for dropping grain into a bin to fill said bin evenly, said apparatus comprising:
a conveyor means for moving grain thereon radially with respect to said bin between a central area of said bin and a periphery thereof, and being rotationally mounted for sweeping around said bin in a horizontal circular plane,
a plurality of sweeper bar means extending at an angle across said conveyor means to divert sequential portions of grain off a side of said conveyor means, said sweeper bar means each extending respectively further across said conveyor means than a preceding sweeper bar means downstream thereof, and
a transition plate means extending along one edge of said conveyor means for receiving grain directed by said sweeper bar means and guiding said grain from said conveyor means into said bin, and
a plurality of grain engaging vane means on said transition plate, said vane means in register with said sweeper bars for directing grain into said bin.

17. Apparatus as in claim 16 wherein a final sweeper bar means ends short of an opposite side of said conveyor means and a portion of said conveyor means along said opposite side is not operatively associated with a sweeper bar means.

18. Apparatus as in claim 16 wherein said vane means on said transition plate include at least one vane blade in respective register with each one of said sweeper bar means.

19. Apparatus as in claim 16 wherein said transition plate is inclined downwardly.

20. Apparatus as in claim 16, further including means for adjusting the angular orientation of said vane means on said transition plate.

21. Apparatus as in claim 20, wherein said vane means comprise blades pivoted to said transition plate, said blades having rearward end portions and further including an adjusting rod connected to said end portions for adjusting the angular orientation of said blades.

22. Apparatus for distributing grain into a bin and comprising:
a conveyor disposed radially in an upper portion of a bin and extending from a central area toward a peripheral area thereof, said conveyor having a grain conveying surface for moving grain introduced thereon at a central portion of the bin radially outwardly toward a peripheral area of the bin, said conveyor being rotationally mounted within said bin for sweeping around said bin, said conveyor transcribing a circular plane within said bin,
said grain carrying surface having a leading edge and a trailing edge along respective opposite sides thereof,
discharge means for discharging grain from one edge of said conveyor, said discharge means including a plurality of sweeper bars extending across said grain carrying surface for removing portions of grain therefrom and discharging sequential portions into said bin from said one edge, and
a transition plate means disposed along one of said leading and said tracking edge for receiving discharged grain from one edge of said conveyor and for distributing grain into said bin, said plate means being inclined downwardly from said one of said leading and trailing edges, and
a plurality of vanes on said transition plate, one vane in operative register with each of said sweeper bars for directing grain on said transition plate.

23. Apparatus for dropping grain into a bin to fill said bin evenly, said apparatus comprising:
a conveyor means including a belt for moving grain thereon radially with respect to said bin between a central area of said bin and a periphery thereof, and being rotationally mounted for sweeping around said bin in a horizontal circular plane,
said conveyor means having a longitudinal edge in the direction of sweep around said bin, and a parallel trailing edge,
a plurality of sweeper bar means extending at an angle across said conveyor belt toward said trailing edge to divert sequential portions of grain off a side of said conveyor means, said sweeper bar means each extending respectively further across said conveyor belt than a preceding sweeper bar means downstream thereof,
a conveyor side wall extending along said leading edge above said conveyor belt for preventing grain from falling from said leading edge into said bin,
an inclined transition plate extending along said trailing edge from a position at least adjacent a first one of said sweeper bar means to a position adjacent at least a last one of said sweeper bar means, and
vane means on said transition plate disposed in operative register with each of said sweeper bar means for guiding grain on said transition plate.

24. A method of evenly distributing grain into a bin comprising the steps of:
introducing grain onto a conveyor within a bin,
conveying grain in a radial direction with respect to a central area of said bin,
sweeping said conveyor around said bin,
sequentially diverting selected portions of said conveyed grain from said conveyor onto a transition plate,
spreading diverted grain on said plate,
guiding sequential portions of grain on said plate by vanes associated with each diverted selected portion, and
dropping diverted grain from said plate into said bin to fill said bin evenly.

25. A method as in claim 24 wherein said diverting step includes engaging sequential side-by-side portions of grain on said conveyor with sweeper bars and diverting grain onto and along a transition plate disposed adjacent said conveyed grain.

26. A method as in claim 25 including the further step of conveying a portion of non-diverted grain to an end of said conveyor and discharging said non-diverted grain therefrom.

27. A method as in claim 26 including the step of increasing the conveyance speed of conveyed grain in response to the volume of grain available for introduction on said conveyor.

* * * * *

UNITED STATES PATENT AND TRADEMARK OFFICE
CERTIFICATE OF CORRECTION

PATENT NO. : 4,352,623
DATED : October 5, 1982
INVENTOR(S) : GEORGE W. SMILEY

It is certified that error appears in the above—identified patent and that said Letters Patent is hereby corrected as shown below:

Col. 1, line 11, after "bin" insert --by--

Col. 6, line 21, after "slide" insert --61--

Col. 6, line 34, after "belt" insert --runs-- col. 6, line 59, after the numeral "5" delete the period (.)

Col. 8, line 62, "surfaces" should be --surface--

Col. 10, line 6, "long" should be --along--

Signed and Sealed this

First Day of February 1983

[SEAL]

Attest:

GERALD J. MOSSINGHOFF

Attesting Officer   Commissioner of Patents and Trademarks